Dec. 3, 1935. E. R. DUDLEY Re. 19,772

ROTARY PUMP OR MOTOR

Original Filed April 1, 1930 3 Sheets-Sheet 1

Dec. 3, 1935. E. R. DUDLEY Re. 19,772

ROTARY PUMP OR MOTOR

Original Filed April 1, 1930 3 Sheets-Sheet 2

INVENTOR.
EDMOND R. DUDLEY
BY
ATTORNEYS.

Dec. 3, 1935. E. R. DUDLEY Re. 19,772

ROTARY PUMP OR MOTOR

Original Filed April 1, 1930 3 Sheets-Sheet 3

INVENTOR.
EDMOND R. DUDLEY
BY
ATTORNEYS.

Reissued Dec. 3, 1935

Re. 19,772

UNITED STATES PATENT OFFICE 19,772

ROTARY PUMP OR MOTOR

Edmond R. Dudley, Altadena, Calif.

Original No. 1,869,053, dated July 26, 1932, Serial No. 440,796, April 1, 1930. Application for reissue July 23, 1934, Serial No. 736,619

5 Claims. (Cl. 103—143)

My invention relates to and has for a purpose the provision of a rotary pump or motor which in one of its uses can be driven from a suitable source of power to effect the pumping of fluids with maximum efficiency, and in another use will function as a prime mover of high efficiency by supplying fluid under pressure thereto.

The invention is particularly directed to the class of rotary machines wherein use is made of a stator and a concentric rotor, the latter having rotary abutments eccentrically of and parallel to the axis of the rotor, and the former having abutments extending into the working chamber of the stator and co-acting with the rotary abutments to effectively induce suction in the chamber and thereby draw the fluid thereinto where it will be compressed between a stator abutment and a rotary abutment, then discharged under pressure from said chamber. It is an important object of the invention to provide a rotary machine of this type wherein means are employed to positively prevent leakage at the lines of contact of the rotary abutments with the stator wall and at the line of contact of a rotary abutment with a co-operable stator abutment and to constantly employ a plurality of rotary abutments which will function to effect a continuous pumping of the fluid, during which operation one stator abutment and one rotary abutment and all the remaining rotary abutments and the stator will positively function to prevent the by-passing of fluid from an intake port to a discharge port of the stator, thereby enabling the machine to be economically and effectively used to compress to a relatively high degree of compression the fluid being acted upon.

A further object is to provide a novel construction of sealing means for the stator abutments which is movable radially of the axis of the rotor and which is co-operable at one time with the rotary abutment to positively close off communication between an intake port and an adjacent discharge port and which, at another time, co-acts with the peripheral surface of the rotor to form a fluid seal at the line between said surface and said means to prevent fluid losses during discharge of the compressed fluid through the discharge ports of the stator.

A further object is to provide sealing means at the stator abutments which can be adjusted radially to increase the sealing effect thereof as may be required to compensate for wear upon the surfaces in the ordinary operation of the machine.

It is a further purpose of my invention to provide a device of the above described character which will effectively pump liquids containing sand and other foreign particles such as is found in oil and water wells, all without clogging or damage by such foreign matter in the fluid being pumped.

I will describe only one form of rotary pump or motor embodying my invention and will then point out the novel features thereof in claims.

In the accompanying drawings.

Figure 1:
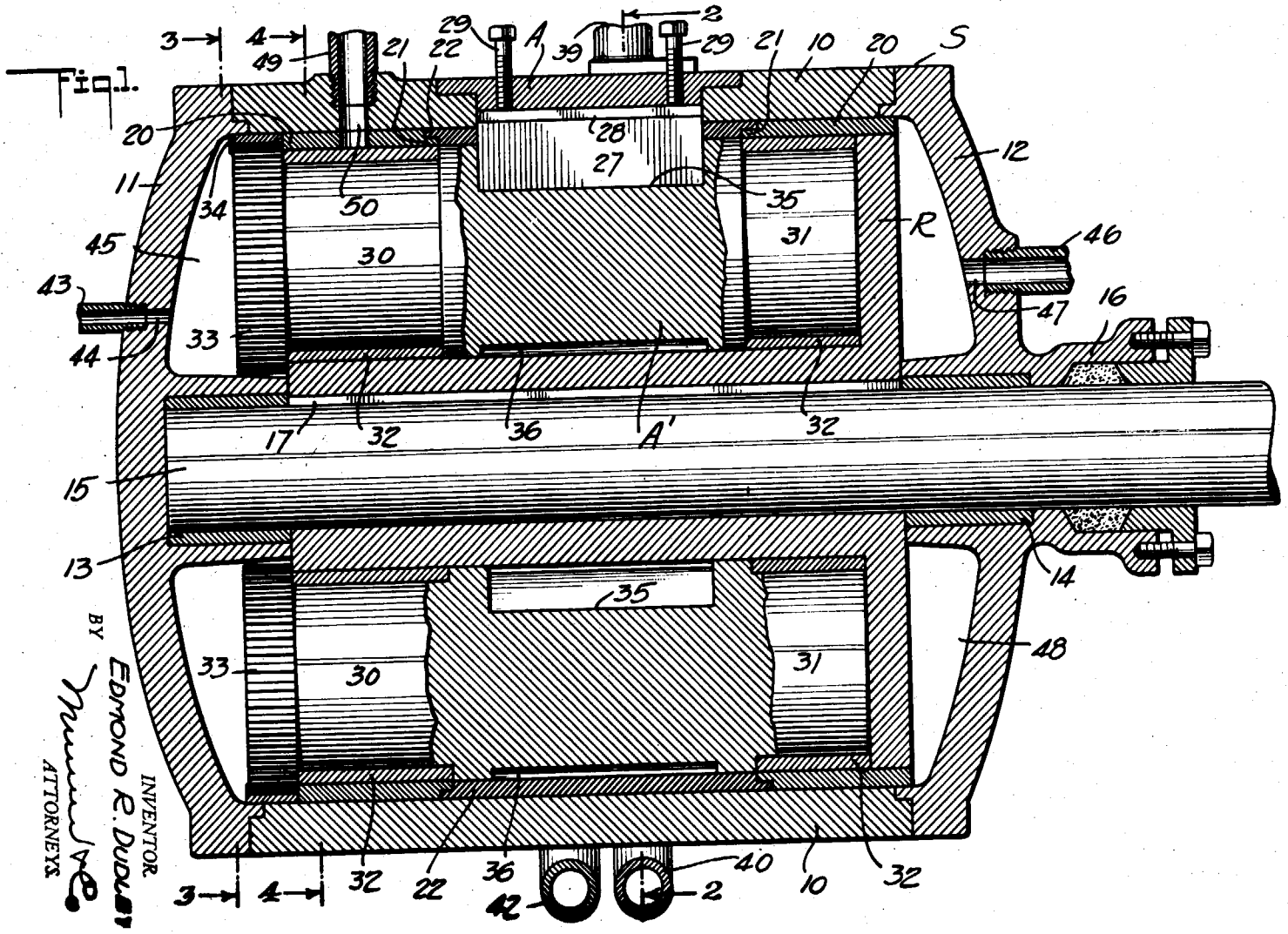
Figure 1 is a view showing in vertical longitudinal section one form of rotary pump or motor embodying my invention.
Figure 2:
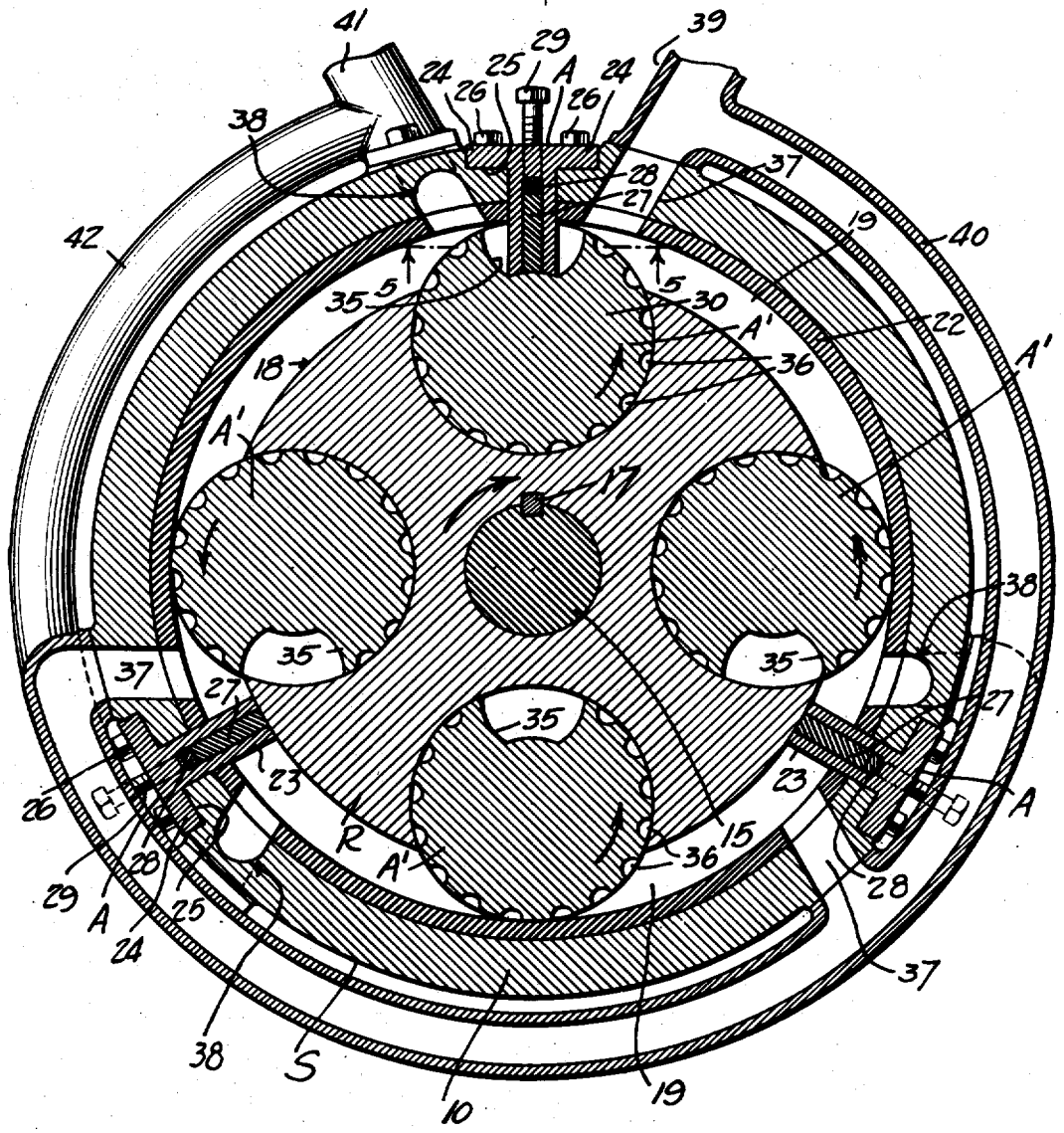
Figure 2 is a transverse sectional view taken on the line 2—2 of Figure 1 and looking in the direction of the arrows.
Figure 3:
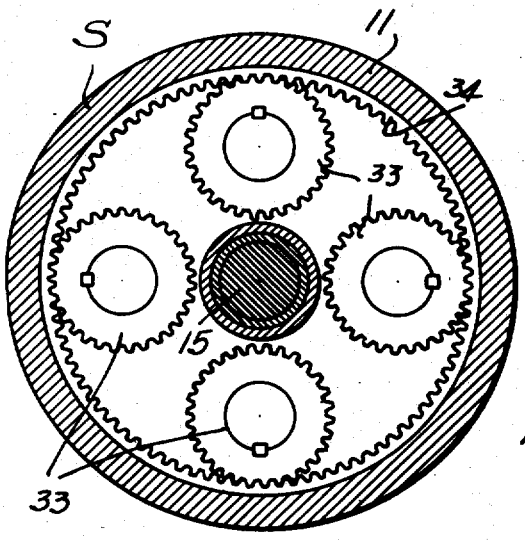
Figure 4:
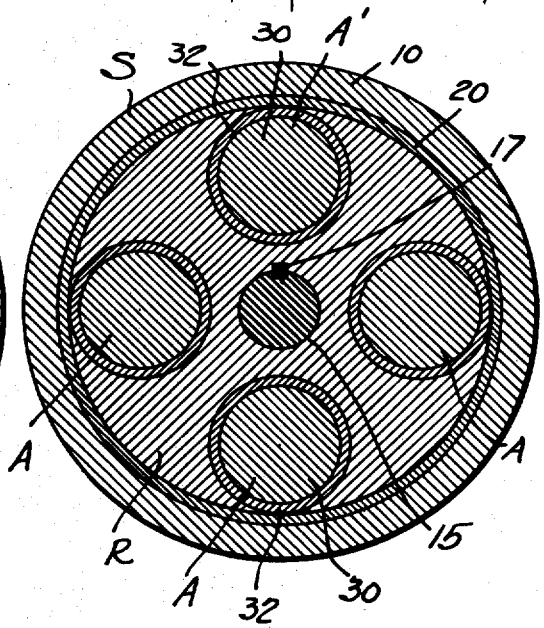
Figure 5:
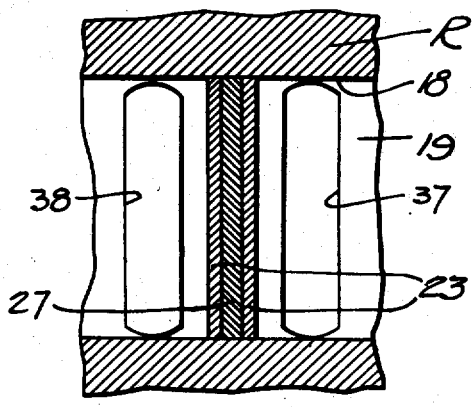

Figures 3 and 4 are transverse sectional views on a reduced scale, taken, respectively, on the lines 3—3 and 4—4 of Figure 1 and looking in the directions of the respective arrows;

Figure 5 is a fragmentary sectional view taken on the line 5—5 of Figure 2 and looking in the direction of the arrows.

Referring specifically to the drawings, in which similar reference characters designate similar parts in each of the several views, my invention, in its present embodiment, comprises a stator S constructed of metal to provide a central and open ended cylindrical section 10, and circular end sections 11 and 12 closing the open ends of the central sections and secured thereto in any suitable manner. The end sections 11 and 12 are provided axially with bearings 13 and 14, respectively, in which is journaled a shaft 15. The shaft 15 projects exteriorly of the section 12, through a suitable stuffing box 16 provided on the section 12 so as to form a fluid tight seal around the shaft, preventing the escape of pressure from within the stator.

Fixed to the shaft 15 by a key 17 is a rotor R in the form of a cylinder, reduced in diameter between its ends as indicated at 18 to co-act with the stator S in defining a continuous annular passage 19 between the stator and rotor.

The end portions of the rotor are slightly less in diameter than the internal diameter of the central section 10 of the stator, and interposed between such portions of the rotor and the central section are metallic liners 20—20, the confronting edges of which are rabbeted as indicated at 21—21 to receive the edges of and clamp a liner 22 of yieldable material such as resilent rubber, against displacement from the inner periphery of the central section 10. The liner 22 thus forms the outer peripheral wall of the passage 19, and functions in a manner to be hereinafter described.

Supported from the central section 10 of the stator S are stator abutments A, and in the present instance three such abutments are shown and are radially disposed at equally spaced intervals circumferentially of the stator. The abutments A are all identical in construction and each comprises a rectangular plate 23 projecting through registering slots in the central section 10 and liner 22, into the passage 19 so as to span the latter transversely. Each abutment A is provided with lateral flanges 24 seating in a recess 25 formed in the central section 10, and secured to the latter by bolts 26 so that the abutments will be rigidly supported in fixed positions in the stator. The plate 23 of each abutment A is slotted from its innermost edge to slidably receive a yieldable packing member 27 of resilient rubber, and a metal pressure bar 28 which abuts the member and is engaged by screws 29. The screws 29 are threaded into the abutment and are operable when rotated to force the packing member radially inward into engagement with the periphery of the rotor R in the passage 19 and thus form a fluid tight seal.

For co-action with the stator abutments A I provide a plurality of rotor abutments A' of which four are shown in the present instance. The rotor abutments are rotatably mounted in the rotor R, eccentrically of and parallel to the axis of the rotor at equally spaced intervals circumferentially.

The rotor abutments A' are identical in construction and each comprises a cylindrical body reduced in diameter at its ends to provide journals 30 and 31 rotatably mounted in bearings 32—32 in the rotor so that the body projects into and spans the passage 19 and has rolling contact with the yieldable liner 22, which latter functions as a result of its yieldability, to provide a fluid tight seal between the rotor abutments and the stator during rotation of the rotor.

Fixed to the extremity of the journal 30 of each rotor abutment A' is a gear 33 constantly meshing with an internal ring gear 34 fixed to the central section 10 of the stator so that during rotation of the rotor, the rotor abutments will be rotated and thus planet about the axis of the rotor. In order to enable the rotor abutments to pass the stator abutments during rotation of the rotor, the body of each rotor abutment is provided with a recess 35 into which the stator abutments are received in successive order, due to the timed relationship between the rotational movement of the rotor and the combined rotational and planeting movements of the rotor abutments. It will be noted that the periphery of the body of each rotor abutment A' is provided with grooves 36 extending longitudinally of the body and coacting with the rotor and with the liner 22 to form pockets for receiving and conveying through the passage 19 any solid particles or other foreign matter such as sand, so as to prevent clogging of and possible damage to the device.

For each stator abutment A, and inlet 37 and an outlet 38 is provided in the stator so as to communicate with the passage 19 at opposite sides of the stator abutment and thus be separated by the latter. The inlets 37 are connected to a main inlet pipe 39 by means of an arcuate branch pipe 40, whereas the outlets 38 are connected to a main outlet pipe 41 by a branch pipe 42 also of arcuate form.

An oil feed pipe 43 leading from a source of oil supply under pressure (not shown) is connected to the end section 11 of the stator S and communicates through a duct 44 with a chamber 45 in the stator so as to provide lubrication for the gears 33 and 34. A water feed pipe 46 is connected to the end section 12 of the stator and communicates through a duct 47 with a chamber 48 in the stator at one end of the rotor, and a second water feed pipe 49 is connected to the central section 10 of the stator and communicates through a duct 50 with the periphery of the rotor adjacent its opposite end. During the operation of the device, water or other fluid under pressure from a suitable source of supply (not shown) is supplied to the pipes 46 and 49 and sets up counter pressure in the stator at opposite sides of the passage 19, sufficient to confine any fluid in the passage against escape therefrom between the rotor and stator, thus preventing any loss of pressure developed by the device during its operation.

In the use of my invention as a pump, its operation is as follows:

With the rotor R driven in the direction of the arrow in Figure 2, the rotor abutments A' will be driven by the gears 33 and will be rotated in the directions of their respective arrows, as shown in this figure. As each rotor abutment passes one of the inlets 37, it will co-act with the respective stator abutment A to induce suction in the passage 19 between the rotor abutment and the stator abutment, so that with the main inlet pipe 39 connected to a source of fluid to be pumped, fluid will be drawn into the passage in the rear of each rotor abutment. Furthermore, pressure will be set up in the passage 19 between each rotor abutment and the particular stator abutment immediately in advance thereof, so that as operation of the rotor continues, the fluid drawn into the passage 19 by any one rotor abutment will be advanced in the passage by the next succeeding rotor abutment and forced through one of the outlets 38 to the main outlet pipe 41.

By the provision of three stator abutments and four rotor abutments as shown, a continuous pumping of the fluid will be effected, as three of the four rotor abutments are at all times active to pump the fluid. On reference to Figure 2 of the drawings, it will be noted that the rotary abutment A' at the top has its recess 35 confronting the yieldable liner 22 and that the inner edge of the packing member 27 is in fluid sealed contact with the inner wall of said recess, thus positively preventing the by-passing of fluid from the intake 37 to the outlet 38. All the remaining rotary abutments are in rolling contact with the yieldable liner 22. The lower packing members 27 are in fluid sealed contact with the peripheral wall of the rotor R. It follows therefrom that the fluid will be effectively compressed against the next adjacent stator abutment without any possibility of leakage at any of the contact lines, and that the pump will, therefore, operate at a high rate of efficiency, there being no pressure losses at any of the contact lines between either the rotary abutments and the annular wall of the stator or between the periphery of the rotor and the packing members 27 or between any rotary abutment and its co-acting packing member of the stator abutment. I lay particular stress upon the use in a machine of this type of an equal number of rotary abutments A' and an unequal number of stator abutments, the latter equi-distantly spaced apart from each other within the working space 19 and carried by the stator and the rotary abutments being equi-distantly spaced from each other around the rotor R. The rotary abutments are thus arranged in diametrically opposite pairs and in consequence thereof a very fine balancing of the rotor is provided, and by equi-distantly spacing the stator abutments from each other as described, the frictional resistance offered the rotor by the members 27 is equalized at the respective points of contact of same therewith. It will be appreciated that the principle embodied in my invention can, with respect to the sealing means employed herein, be practiced with but a single stator abutment and a single rotor abutment, which arrangement, however, has the disadvantage of producing an intermittent pumping action rather than the most desirable and efficient continuous pumping of a fluid.

In the use of my invention as a motor or prime mover, it will be clear that by supplying a fluid under pressure to the main inlet pipe 39, the fluid in entering the passage 19 through the inlets 37 will set up pressure in the passage, causing the rotor and stator abutments to co-act in rotating the rotor R in the direction of the arrow in Figure 2; the pressure fluid after use being discharged from the passage through the outlets 38.

Although I have herein shown and described only one form of rotary pump or motor embodying my invention, it is to be understood that various changes and modifications may be made therein, without departing from the spirit of the invention and the spirit and scope of the appended claims.

I claim as my invention:

1. A device of the character described comprising a cylindrical stator, a cylindrical rotor journaled axially in the stator and reduced in diameter intermediate its ends to define an annular passage between the stator and rotor having an inlet and an outlet, the rotor being of less diameter than the internal diameter of the stator, metallic liners interposed between the stator and the end portions of the rotor, a liner of yieldable material interposed between the stator and the intermediate portion of the rotor, co-acting means on said liners for securing the yieldable liner against displacement, and co-acting means on the stator and rotor, responsive to rotation of the rotor, to pump fluid from the inlet through the passage to the outlet.

2. A device of the character described comprising a cylindrical stator, a cylindrical rotor journaled axially in the stator and reduced in diameter intermediate its ends to define an annular passage between the stator and rotor having an inlet and an outlet, the rotor being of less diameter than the internal diameter of the stator, metallic liners interposed between the stator and the end portions of the rotor, a liner of yieldable material interposed between the stator and the intermediate portion of the rotor, the confronting edges of the metallic and yieldable liners having rabbeted engagement to secure the yieldable liner against displacement, and co-acting means on the stator and rotor, responsive to rotation of the rotor, to pump fluid from the inlet through the passage to the outlet.

3. In a rotary machine of the type described, the combination with a stator and a co-operable rotor, between both of which is a working space, an even number of equi-distantly spaced rotary abutments carried by the rotor and an uneven number of radial abutments carried by the stator and extending into said working space for successive co-action with the rotary abutments, the stator having fluid intake and discharge ports opening to the working space at the respective sides of each of the stator abutments, of a yieldable non-metallic liner embraced by the annular wall of the stator and over which the rotary abutments yieldingly roll while in constant fluid-sealed contact therewith; and yieldable means carried by the stator abutments for fluid-sealing contact successively with the rotary abutments during operation of the rotor.

4. A rotary pump including a stator and a co-operable rotor, the stator having an annular wall and the rotor having a peripheral surface co-operable with said annular wall to define therewith an intervening working space therebetween, the stator having a yieldable liner embraced by said annular wall, the stator having an abutment provided with a yieldable member adjustable transversely of the working space and against the peripheral surface of the rotor, the stator having fluid intake and discharge ports at the opposite sides of its abutment, and a rotary abutment carried by the rotor and extending into said working space for co-action, respectively, with the yieldable liner and the aforestated yieldable member during rotation of the rotor, and having constant engagement with said liner.

5. A rotary pump including a stator provided with an uneven number of pairs of fluid intake and discharge ports, respectively, a rotor co-operable with the stator and defining therewith a working space, an abutment extending into the working space from between each pair of intake and discharge ports; an annular member of yieldable material lining the wall of the stator, an even number of cylindrical rotary abutments carried by the rotor and co-operable with said annular yieldable member and with the stator abutments to suck fluid into the space at the intake ports, then compress the fluid and discharge same from the discharge ports, and being in constant rolling engagement with said annular member each stator abutment including a yieldable member movable relatively to the peripheral surface of the rotor and adapted to engage with the rotary abutments when the latter occupy positions between the intake and discharge ports to positively seal the spaces between same and thereby prevent fluid from the discharge sides by-passing to the intake sides of the rotary abutments, the relation of the stator abutments with respect to the rotary abutments being such that at all times one of the rotary abutments co-acts with one of the stator abutments while all remaining rotary abutments are being moved in active pumping directions through said working space.

EDMOND R. DUDLEY.